J. PARKER & I. COOK.
Hydraulic Telescopic Platform-Elevators.
No. 5,296. Reissued Feb. 25, 1873.
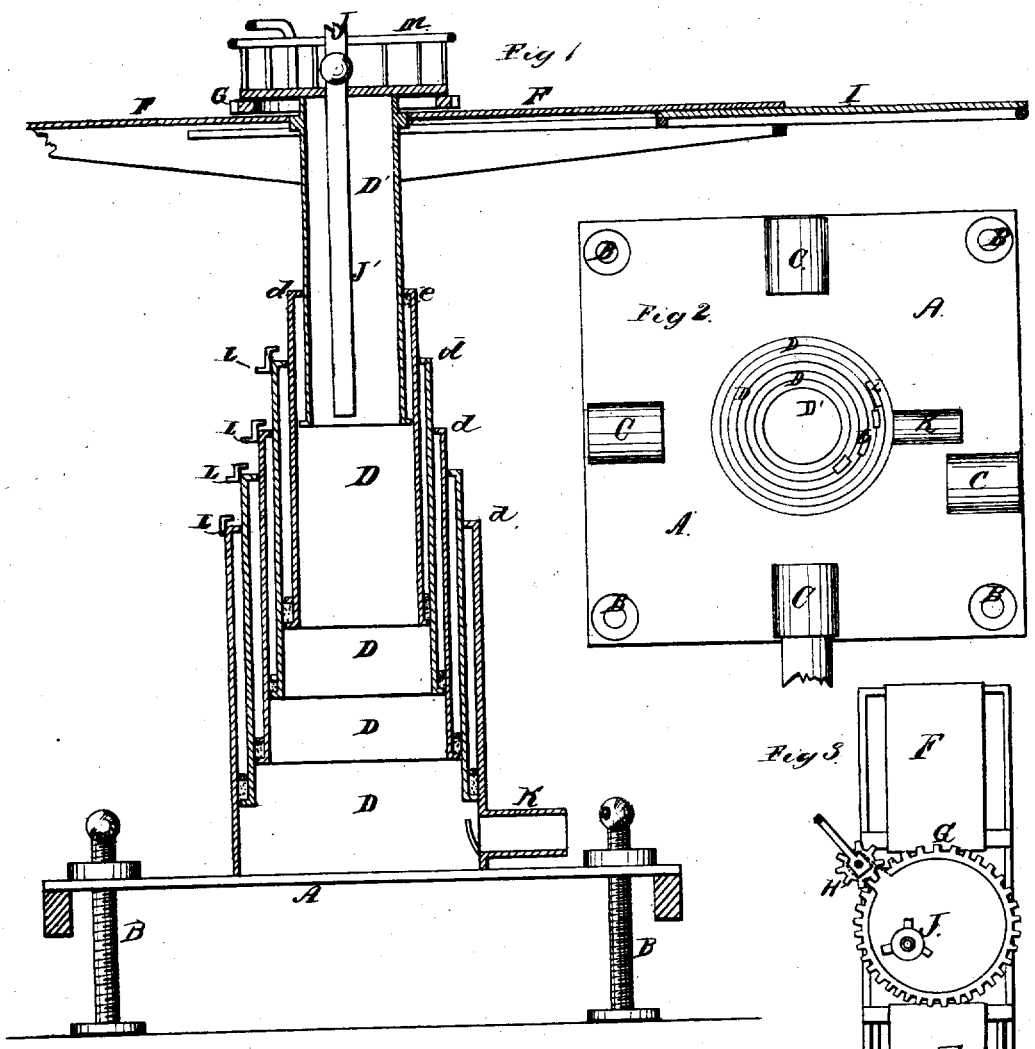
Witnesses:
Harry C. Clark.
Columbus Christe
Inventors.
Judah Parker, &
Isaac Cook by
Dyer, Beach & Co.
attys.
AM. PHOTO-LITHOGRAPHIC CO. N.Y. (OSBORNE'S PROCESS)

UNITED STATES PATENT OFFICE.

JUDAH PARKER AND ISAAC COOK, OF SAN FRANCISCO, CAL.; SAID PARKER ASSIGNOR OF ONE-HALF OF HIS INTEREST TO SAMUEL P. TAYLOR.

IMPROVEMENT IN HYDRAULIC TELESCOPIC PLATFORM-ELEVATORS.

Specification forming part of Letters Patent No. 129,421, dated July 16, 1872; antedated July 11, 1872; reissue No. 5,296, dated February 25, 1873.

*To all whom it may concern:*

Be it known that we, JUDAH PARKER and ISAAC COOK, of San Francisco, county of San Francisco and State of California, have invented a new and useful Hydraulic Tower as a Fire-Escape, Fire-Extinguisher, and other purposes, as will hereinafter more fully appear; and we do hereby declare that the following is a full, clear, and exact description of the same, reference being had to the accompanying drawing and to the letters marked thereon.

The principal object of our invention is to provide an improved device or engine for attaining an elevation for the purpose of extinguishing fires and rescuing the occupants of burning buildings and other purposes to which it is adapted; and it consists mainly of a series of sections of suitable shape, each one being smaller than the one next below it; and the whole can be shut or opened like a telescope. The joints are made tight, and when water is forced into the machine the sections will be elevated as high as desired. The top section is open at its lower end, so that when water is introduced an air-chamber is formed which acts on the top of the column of water concurrent with the pressure from the point of introduction, which forces the water through a pipe at the top of the tower, to which is connected a hose of the desired length, so that water can be carried into or upon a burning building. It also consists of an adjustable bridge to form a platform for passage to or from the building when the tower is in a vertical position, and to various operating devices and details of construction, which will be more particularly described hereinafter.

In the drawing, Figure 1 represents a vertical section of our invention. Fig. 2 is a plan of the base and the sections. Fig. 3 is a top view, showing the extension-bridge.

A is a strong base-plate, which may be made of wood or iron in any suitable manner, and mounted upon wheels for greater convenience of transportation; or the entire machine may be placed beneath the pavement of streets, and be elevated by the introduction of water from the water-mains of a city, in which case the upper end may be protected by a cover placed flush with the surface of the pavement or street, to be removed by a fireman or attendant, and the water turned on the machine to operate it and elevate water for the extinguishment of fires, to be taken from the top of the tower through a pipe, and carried, by means of hose, to any point of a building or block. When used as a portable engine, at each corner of the platform A are leveling-screws B, which are turned down so as to rest upon the ground and level up the platform, besides giving it steadiness. Midway in each of the sides are sockets, C, into which extension-bars can be placed, which reaching out horizontally serve to give a much larger base and great additional stiffness when required. The tower is made, preferably, of boiler-iron, in cylindrical sections D D′ of about seven feet or other convenient length. These sections are made of a decreasing size, so that each section slides into the next below, fitting closely. Flanges *d d* are made upon the sections, which prevent them from being forced entirely apart, and collars are so arranged as to hold packing, as at *e*, to render the whole perfectly tight. A platform, F, of considerable length, is secured to the top of the smallest section D′, so as to extend some distance horizontally each side of the tower, and so attached that it can be rotated to point in any direction which may be desired by means of the gear-wheel pinion H. A sliding platform, I, is fitted to be moved out in a line with the platform F on one side by means of a rack and pinion, or any well-known device, so that when the tower is at the proper height and the platform pointed in the right direction the platform I can be extended to the roof or to a window. One or more nozzles, J, for the attaching of hose, arise from the top of the smaller section D′, and the pipe J′ extends down sufficiently in the section to enable the latter to act as an air-chamber, both to give a steady stream from the nozzle, and to relieve the tower from trembling or vibration when in operation; and this is an important feature of our invention when taken in connection with the fact that water can be taken in a continuous and steady stream from a height so great after having served the purpose of raising the tower to the desired elevation.

The operation is as follows: If the engine or machine is stationary beneath the pavement the cover is removed, or when the machine is a portable one it is drawn into the proper position, where it is leveled and braced sufficiently, and water is then turned on from the hydrant or mains, which is forced into the bottom or lower section D through a pipe or pipes, K. The connection may be made with a hydrant or with an engine, so as to get sufficient head, and the sections will rise, the upper one first, and so on until the desired altitude is attained. A sufficient number of men can ride upon the tower, and they can direct the bridge to the proper point and run out the extension-platform I. Hose—which is also carried up—is then attached to the nozzles, and can be carried to any point over the bridge, or the hose may be coiled around the nozzle at the top of the tower, so as to be ready for use when the alarm of fire is sounded. The guard-rail M, for the safety of the men, may be made hollow and perforated. This can be connected with the interior of the tower; and in case the heat is very intense a spray of water can be thrown from the rail over the men for their protection.

In order to retain the tower at any desired height locks L are made fast to the sections, so that if it be desired to run up only a few of the sections these locks will hold the others and prevent them from being extended. The tower can be gradually lowered at any time by drawing out the water through a check-valve, and this water can be used by the engine on the embers so as not to be wasted. A light tower of this sort might be made available in military operations for a lookout, and compressed air might be used to elevate it.

When employed for fire purposes the whole tower and appurtenances will not weigh over two tons, and can be elevated in less than five minutes. By elevating the water in a large body much less hose will be needed, and the efficiency of the water will not be impaired by the friction of a long line of hose.

Having thus described our invention, we do not claim, broadly, a sectional or telescopic tower operated by machinery, for such a device is known and in use; but

What we do claim as new in our invention, and desire to secure by Letters Patent, is—

1. A hydraulic sectional elevator adapted to discharge water at the top, substantially as described.

2. In combination with the air-chamber in the section D′, the pipe J′, as and for the purpose set forth and shown.

3. The described elevator having the sections D, hollow upper section D′, and discharge-tube J′, as described.

4. In combination with the sectional tower, as shown, the locking devices L L, substantially as herein described.

5. In combination with the sectional tower, as described, the adjustable platform F and the extension-bridge I, substantially as herein described.

In witness whereof we have hereunto set our hands and seals.

JUDAH PARKER. [L. S.]
ISAAC COOK. [L. S.]

Witnesses:
C. W. M. SMITH,
PHILIP MAHLER.